United States Patent
Hashimoto et al.

(10) Patent No.: US 12,448,586 B2
(45) Date of Patent: Oct. 21, 2025

(54) UNSATURATED FATTY ACID-CONTAINING WATER-IN-OIL TYPE COMPOSITION AND METHOD FOR PRODUCING SAME

(71) Applicant: FUJI OIL CO., LTD., Izumisano (JP)

(72) Inventors: Arata Hashimoto, Izumisano (JP); Masaharu Kato, Izumisano (JP)

(73) Assignee: FUJI OIL HOLDINGS INC., Izumisano (JP)

( * ) Notice: Subject to any disclaimer, the term of this patent is extended or adjusted under 35 U.S.C. 154(b) by 408 days.

(21) Appl. No.: 18/009,055

(22) PCT Filed: May 20, 2021

(86) PCT No.: PCT/JP2021/019190
§ 371 (c)(1),
(2) Date: Dec. 8, 2022

(87) PCT Pub. No.: WO2021/251097
PCT Pub. Date: Dec. 16, 2021

(65) Prior Publication Data
US 2023/0250360 A1    Aug. 10, 2023

(30) Foreign Application Priority Data
Jun. 12, 2020   (JP) .................. 2020-102311

(51) Int. Cl.
C11B 5/00    (2006.01)
(52) U.S. Cl.
CPC .......... C11B 5/0035 (2013.01); C11B 5/0028 (2013.01); C11B 5/0092 (2013.01)
(58) Field of Classification Search
CPC .... C11B 5/0035; C11B 5/0028; C11B 5/0092
See application file for complete search history.

(56) References Cited

U.S. PATENT DOCUMENTS

| | | |
|---|---|---|
| 2020/0030198 A1 | 1/2020 | Sugiyama |
| 2020/0347300 A1 | 11/2020 | Kato et al. |
| 2021/0161165 A1 | 6/2021 | Morikawa et al. |
| 2021/0345633 A1 | 11/2021 | Mizushima |

FOREIGN PATENT DOCUMENTS

| | | |
|---|---|---|
| JP | 11228838 A | 8/1999 |
| JP | 2000032912 A | 2/2000 |
| JP | 2013159730 A | 8/2013 |
| JP | 2015116189 A | 6/2015 |
| JP | 2017225381 A | 12/2017 |
| JP | 2018139552 A | 9/2018 |
| WO | 2017150558 A1 | 9/2017 |
| WO | 2018190203 A1 | 10/2018 |
| WO | 2019044351 A1 | 3/2019 |
| WO | 2020032107 A1 | 2/2020 |

OTHER PUBLICATIONS

International Search Report for International Application No. PCT/JP2021/019190 dated Aug. 3, 2021, 6 pages including English translation.
Supplementary European Search Report dated Jun. 3, 2024 for corresponding European Application No. 21821086.2, 8 pages.

*Primary Examiner* — Kamal A Saeed
(74) *Attorney, Agent, or Firm* — MH2 Technology Law Group, LLP

(57) ABSTRACT

An object of the present invention is to provide a method for more strongly preventing oxidation of unsaturated fatty acids using a simple method. In particular, an object of the present invention is to provide a method for suppressing both an unpleasant odor that appears in an initial stage of storage and an unpleasant odor that appears subsequently. The present invention has been accomplished by finding that an unpleasant odor that appears in an initial stage of storage, as well as an unpleasant odor that appears subsequently, can both be suppressed in an unsaturated-fatty-acid-containing water-in-oil composition comprising an aqueous phase A having a pH adjusted to 3.1 to 8 in which at least one member selected from the group consisting of ascorbic acid and polyphenols is dissolved, an aqueous phase B having a pH adjusted to 0.5 to 3 in which at least one member selected from the group consisting of ascorbic acid and polyphenols is dissolved, and an oil phase containing an unsaturated fatty acid, the aqueous phase A and the aqueous phase B, each having a particle size of 500 nm or less, being finely dispersed individually in the oil phase.

8 Claims, No Drawings

UNSATURATED FATTY ACID-CONTAINING WATER-IN-OIL TYPE COMPOSITION AND METHOD FOR PRODUCING SAME

CROSS-REFERENCE TO RELATED APPLICATIONS

This application is a U.S. National Stage application of PCT/JP2021/019190 filed 20 May 2021, which claims priority to Japanese application No. 2020-102311 filed 12 Jun. 2020, the entire disclosures of which are hereby incorporated by reference in their entireties.

TECHNICAL FIELD

The present invention relates to an unsaturated-fatty-acid-containing water-in-oil composition and a production method for the composition.

BACKGROUND ART

Unsaturated fatty acids are oxidized over time due to the presence of a double bond and can give off an unpleasant odor. This trend is particularly noticeable in polyunsaturated fatty acids.

Patent Literature (PTL) 1 discloses a method for preventing oxidation of polyunsaturated fatty acids.

CITATION LIST

Patent Literature

PTL 1: WO2017/150558

SUMMARY OF INVENTION

Technical Problem

An object of the present invention is to provide a method for more strongly preventing oxidation of unsaturated fatty acids using a simple method. In particular, an object of the present invention is to provide a method for suppressing both an unpleasant odor that appears in an initial stage of storage and an unpleasant odor that appears subsequently.

Solution to Problem

The present inventors conducted extensive research to solve the above problems.

It was possible for the method of PTL 1 to prevent oxidation of polyunsaturated fatty acids to some extent.

The research of the present inventors has confirmed the following. The method of PTL 1 can strongly inhibit an increase in the POV over time; however, the presence of unpleasant odor that gave a sensation perceived as discomfort was confirmed even in the initial stage of storage, i.e., still before the POV started to increase. Suppressing such an unpleasant odor that appears in the initial stage of storage was difficult.

As a result of further research, the present inventors found that an unpleasant odor that appears in the initial stage of storage, as well as an unpleasant odor that appears subsequently, can be suppressed in a fat-and-oil composition comprising an oil phase in which two or more aqueous phases of different pH values, each containing a dissolved water-soluble antioxidant, are finely dispersed. The present invention has thus been completed.

More specifically, the present invention relates to the following.

(1) An unsaturated-fatty-acid-containing water-in-oil composition comprising:
an aqueous phase A having a pH adjusted to 3.1 to 8 in which at least one water-soluble antioxidant selected from the group consisting of ascorbic acid and polyphenols is dissolved,
an aqueous phase B having a pH adjusted to 0.5 to 3 in which at least one water-soluble antioxidant selected from the group consisting of ascorbic acid and polyphenols is dissolved, and
an oil phase containing an unsaturated fatty acid,
the aqueous phase A and the aqueous phase B, each having a particle size of 500 nm or less, being finely dispersed individually in the oil phase.

(2) The unsaturated-fatty-acid-containing water-in-oil composition according to Item (1), wherein the water-soluble antioxidant dissolved in the aqueous phase A is at least one member selected from the group consisting of ascorbic acid and tea catechin.

(3) The unsaturated-fatty-acid-containing water-in-oil composition according to Item (1) or (2), wherein the water-soluble antioxidant dissolved in the aqueous phase B is at least one member selected from the group consisting of ascorbic acid and tea catechin.

(4) The unsaturated-fatty-acid-containing water-in-oil composition according to any one of Items (1) to (3), wherein the unsaturated fatty acid is a polyunsaturated fatty acid.

(5) A method for producing an unsaturated-fatty-acid-containing water-in-oil composition, comprising
1) preparing an aqueous phase A having a pH adjusted to 3.1 to 8 in which at least one member selected from the group consisting of ascorbic acid and polyphenols is dissolved,
2) preparing an aqueous phase B having a pH adjusted to 0.5 to 3 in which at least one member selected from the group consisting of ascorbic acid and polyphenols is dissolved,
3) preparing an oil phase containing an unsaturated fatty acid, and
4) dispersing the aqueous phases A and B individually in the oil phase.

(6) A method for producing an unsaturated-fatty-acid-containing water-in-oil composition, comprising
1) preparing an aqueous phase A having a pH adjusted to 3.1 to 8 in which at least one member selected from the group consisting of ascorbic acid and polyphenols is dissolved,
2) preparing an aqueous phase B having a pH adjusted to 0.5 to 3 in which at least one member selected from the group consisting of ascorbic acid and polyphenols is dissolved,
3) preparing an oil phase containing an unsaturated fatty acid,
4) dividing the oil phase of 3) into oil phases to disperse the aqueous phase A and the aqueous phase B in the oil phases respectively to form water-in-oil emulsions, and
5) mixing the water-in-oil emulsions obtained in 4).

(7) A method for suppressing both an unpleasant odor that appears in an initial stage of storage and an unpleasant odor that appears subsequently in an unsaturated-fatty-acid-containing water-in-oil composition, comprising 1) preparing an aqueous phase A having a pH adjusted to 3.1 to 8 in which at least one member selected from the group consisting of ascorbic acid and polyphenols is dissolved,
2) preparing an aqueous phase B having a pH adjusted to 0.5 to 3 in which at least one member selected from the group consisting of ascorbic acid and polyphenols is dissolved,
3) preparing an oil phase containing an unsaturated fatty acid, and
4) dispersing the aqueous phases A and B individually in the oil phase.

(8) A method for suppressing both an unpleasant odor that appears in an initial stage of storage and an unpleasant odor that appears subsequently in an unsaturated-fatty-acid-containing water-in-oil composition, comprising
1) preparing an aqueous phase A having a pH adjusted to 3.1 to 8 in which at least one member selected from the group consisting of ascorbic acid and polyphenols is dissolved,
2) preparing an aqueous phase B having a pH adjusted to 0.5 to 3 in which at least one member selected from the group consisting of ascorbic acid and polyphenols is dissolved,
3) preparing an oil phase containing an unsaturated fatty acid,
4) dividing the oil phase of 3) into oil phases to disperse the aqueous phase A and the aqueous phase B in the oil phases respectively to form water-in-oil emulsions, and
5) mixing the water-in-oil emulsions obtained in 4).

Advantageous Effects of Invention

According to the present invention, an unsaturated-fatty-acid-containing composition in which an unpleasant odor that appears in an initial stage of storage and an unpleasant odor that appears subsequently are both suppressed can be obtained by using a simple method.

DESCRIPTION OF EMBODIMENTS

The present invention relates to an unsaturated-fatty-acid-containing composition in which an unpleasant odor that appears in the initial stage of storage and an unpleasant odor that appears subsequently are both suppressed. "Initial stage of storage" as used here refers to the stage in which no increase in the POV is observed, and specifically refers to the state up to the second day of storage.

In this stage, although no increase in the POV is observed, an unpleasant odor that gives a sensation perceived as discomfort appears.

A primary object of the present invention is to suppress the appearance of such an unpleasant odor. A second object of the present invention is to also suppress the appearance of unpleasant odor that appears with an increase in the POV during longer-term storage. The present invention achieves both of these objects.

"POV" refers to a peroxide value (POV). The POV is measured according to a commonly known method. The phrase "no increase in the POV is observed" refers to the state in which a significant increase in the POV cannot be confirmed from the measurement results obtained by a commonly known method.

In the present invention, an unsaturated fatty acid refers to a fatty acid with a double bond. "Polyunsaturated fatty acid" is a generic term for fatty acids with two or more double bonds. Specific examples include DHA (docosahexaenoic acid) and EPA (eicosapentaenoic acid). The term "polyunsaturated fatty acid" is sometimes abbreviated as "PUFA."

In the present invention, "unsaturated-fatty-acid-containing" means containing fat and oil containing an unsaturated fatty acid as at least one fatty acid constituting a triglyceride.

In the present invention, it is preferable to contain a polyunsaturated fatty acid as the unsaturated fatty acid, from the standpoint of achieving its remarkable effect.

The unsaturated-fatty-acid-containing water-in-oil composition of present invention desirably contains 20 to 50 mass % of PUFAs as the total amount of DHA and EPA. This amount is more desirably 25 to 48 mass %, and still more desirably 27 to 45 mass %. When the amount of PUFAs is an appropriate value, the appearance of unpleasant odors in the initial stage and the later stage of storage can both be suppressed in the unsaturated-fatty-acid-containing water-in-oil composition of the present invention.

Ascorbic acid as used in the present invention is also called "vitamin C." Further, ascorbic acid salts are obtained by binding ascorbic acid to metals. Specific examples include sodium ascorbate and calcium ascorbate. An ascorbic acid salt being dissolved in an aqueous phase is substantially synonymous with ascorbic acid being present in the aqueous phase.

In terms of the amount, however, when an ascorbic acid salt is dissolved, the amount equivalent to ascorbic acid is calculated by multiplying the amount of the ascorbic acid salt by "molecular weight of ascorbic acid/molecular weight of the ascorbic acid salt." More specifically, when sodium ascorbate is used, the amount equivalent to ascorbic acid is calculated by multiplying the amount of sodium ascorbate by 0.89 (=molecular weight of ascorbic acid (176.1)/molecular weight of sodium ascorbate (198.1)). The amount equivalent to ascorbic acid may be simply expressed as the amount of ascorbic acid.

The unsaturated-fatty-acid-containing composition of the present invention is a water-in-oil emulsified composition. Since it is of a water-in-oil type, a polyunsaturated-fatty-acid-containing composition in which the appearance of unpleasant odors is suppressed can be obtained.

In the present invention, at least two aqueous phases are used. For convenience, these aqueous phases may be referred to as an aqueous phase A and an aqueous phase B.

In the aqueous phase A, a water-soluble antioxidant must be dissolved, and the pH must be adjusted to 3.1 to 8. In the aqueous phase B, a water-soluble antioxidant must be dissolved, and the pH must be adjusted to 0.5 to 3.

The pH of the aqueous phase A is more desirably 4 to 7.8, and still more desirably 5 to 7.5. The pH of the aqueous phase B is more desirably 0.6 to 2.5, and still more desirably 0.7 to 2.1.

In the unsaturated-fatty-acid-containing composition of the present invention, the aqueous phases each having a pH adjusted to an appropriate value are finely dispersed in an oil phase. This makes it possible to suppress both an unpleasant odor that appears in the initial stage of storage and an unpleasant odor that appears subsequently.

The pH in the aqueous phases A and B can be adjusted by adding an acid or alkali. The pH can also be adjusted by using an ascorbic acid salt instead of some or all of ascorbic acid. The acid or alkali for use, as well as the type of the ascorbic acid salt for use, can be set freely as long as the effect of the present invention is not impaired.

The antioxidants for use in the aqueous phases A and B must be at least one member selected from the group consisting of ascorbic acid and polyphenols, and more desirably at least one member selected from the group consisting of ascorbic acid and tea catechin.

The antioxidant for use in the aqueous phase A desirably includes ascorbic acid. The antioxidant for use in the aqueous phase B desirably includes polyphenols, and more desirably tea catechin.

Using an ascorbic acid salt instead of some or all of the ascorbic acid is possible. Further, using one or more different types of ascorbic acid salts in combination is also possible.

The amount of the water-soluble antioxidant in total in each aqueous phase is desirably 15 to 60 mass %, more desirably 17 to 50 mass %, and still more desirably 25 to 47 mass %.

The use of an appropriate amount of an appropriate antioxidant in each aqueous phase achieves excellent oxidation stability of the unsaturated-fatty-acid-containing composition of the present invention.

Each of the aqueous phases can also contain a water-soluble solid, together with the antioxidant. Examples of the water-soluble solid include carbohydrates and proteins. Carbohydrates are more desirable. Of carbohydrates, sucrose is most desirable. The presence of an appropriate water-soluble solid facilitates fine dispersion of the aqueous phases in the oil phase and further enhances antioxidative activity.

In each aqueous phase, the sum of the amount of the water-soluble solid and the amount of the antioxidant is desirably 30 to 68 mass %, more desirably 35 to 67 mass %, and still more desirably 40 to 66 mass %.

The percentage of the aqueous phases in the unsaturated-fatty-acid-containing water-in-oil composition of the present invention can be appropriately set, for example, according to the amount of the antioxidant in each aqueous phase and according to whether the unsaturated fatty acid contained in the target oil phase is a polyunsaturated fatty acid. Typically, however, the percentage of the aqueous phases is desirably 2 to 10 mass %, more desirably 2.5 to 8 mass %, and still more desirably 3 to 7.5 mass %. The aqueous phases referred to here are the total of the dispersed aqueous phases as a whole.

The amount ratio of the aqueous phase A to the aqueous phase B can also be appropriately set according to the amount, type, etc. of the antioxidant dissolved in each aqueous phase. Typically, however, this amount ratio is desirably in the range of 20:80 to 80:20, and more desirably 30:70 to 78:22.

In the oil phase in the present invention, an unsaturated fatty acid is present. The unsaturated fatty acid is more desirably a polyunsaturated fatty acid. Of course, multiple types of fats and oils can also be used for the oil phase.

The oil phase can also contain an oil-soluble material, if necessary. In particular, the presence of an oil-soluble emulsifier can make the water-in-oil emulsified state more stable. The oil-soluble emulsifier as used here refers to lecithin, as well as emulsifiers having an HLB of less than 7. Specific examples include polyglycerol condensed ricinoleic acid esters, sucrose fatty acid esters, and glycerol fatty acid esters. Polyglycerol condensed ricinoleic acid esters are more desirable. Polyglycerol condensed ricinoleic acid esters may be abbreviated as "PGPR." When the oil phase contains an appropriate oil-soluble emulsifier, a polyunsaturated-fatty-acid-containing composition in which an unpleasant odor that appears in the initial stage of storage and an unpleasant odor that appears subsequently are both suppressed can be obtained.

In the present invention, two or more aqueous phases must be present independently as aqueous phase particles in the oil phase. Therefore, certain ingenuity is required in the production. Specifically, for example, when aqueous phases A and B are used, the aqueous phase A is added to the oil phase and stirred or the like to form a stable water-in-oil emulsified structure; subsequently, the aqueous phase B is added thereto to further perform emulsification operation. In this case, the aqueous phases may be added in any order.

Alternatively, the oil phase is appropriately divided into oil phases; the aqueous phase A and the aqueous phase B are dispersed in the oil phases, respectively, to obtain water-in-oil emulsions; and these water-in-oil emulsions are mixed to thus obtain a water-in-oil emulsion in which the aqueous phase A and the aqueous phase B are independently dispersed.

In the present invention, the particle size of the aqueous phases A and B in the oil phase must be 500 nm or less, more desirably 400 nm or less, and still more desirably 300 nm or less. The present invention can achieve antioxidative activity by finely dispersing each of the aqueous phases in the oil phase.

Examples of the method for measuring the particle size of the aqueous phases include the method described below.

Device name: Zetasizer Nano S; Manufacturer: Malvern

The measurement is performed by diluting 2 μl of a fat-and-oil composition to be measured in 2 ml of hexane.

(The measurement results of the sample on the first day after preparation are used for evaluation.)

Temperature: 20.0° C.
Equilibrium time: 180 seconds
Cell: Glass cell
Measurement angle: 173°
Positioning method: Optimum position selected
Selection of automatic attenuation: Yes In the present invention, the exact mechanism of action by which the appearance of an unpleasant odor is suppressed both in the initial stage and the later stage of storage is unknown. The present inventors assume the mechanism of action as follows.

Unpleasant odors from polyunsaturated fatty acids are believed to appear with their oxidation. There is a certain correlation between the unpleasant odors and the POV, which is an index of oxidation. However, even in the initial stage of storage, during which no increase in the POV is observed, there were cases in which an unpleasant odor that could be perceived as discomfort appeared, although its cause was unknown.

The present inventors presumed that the unpleasant odor in the initial stage of storage would also appear based on some kind of oxidation reaction that is not detected as a POV, and thought that stronger antioxidative activity is necessary to prevent it.

The antioxidative activity of an antioxidant can depend on pH. Thus, when the pH is within a range in which antioxidants would undergo oxidative degradation, it is believed that antioxidants will exhibit strong antioxidative activity for a short period of time, but that it will be difficult to expect antioxidants to exhibit antioxidative activity for a long period of time.

In the present invention, the aqueous phases in which an antioxidant is dissolved are surrounded by the oil phase; it is thus believed that the oxygen supply is blocked, preventing the occurrence of oxidation. Therefore, even when the pH is within a range in which antioxidants would undergo oxidative degradation, it was believed that the antioxidative activity would be used efficiently to prevent oxidation of the unsaturated fatty acid surrounding the antioxidant without immediate occurrence of oxidative degradation. That is, it was believed to be possible to expect strong antioxidative activity even if it would be for a short period of time.

However, even in such cases, maintaining antioxidative activity for a long period of time is difficult; it was thus believed to be necessary to use an additional antioxidant in an aqueous phase having a pH adjusted to a value that causes less oxidative degradation of antioxidants.

In the present invention, as described above, the water-in-oil composition comprises both an aqueous phase having a pH adjusted to a value at which antioxidants are assumed to exhibit strong antioxidative activity although it is accompanied with degradation of the antioxidants themselves, and an aqueous phase having a pH adjusted to a value at which antioxidants will be relatively stable and are expected to exhibit weak antioxidative activity but long-lasting antioxidative activity. This structure was assumed to be able to suppress both an unpleasant odor that appears in the initial stage of storage and an unpleasant odor that appears subsequently.

Next, the method for producing an unsaturated-fatty-acid-containing water-in-oil composition of the present invention is described with reference to examples.

In the present invention, two or more aqueous phases with different pH values are prepared. Here, as an example, an aqueous phase having a pH of 3.1 to 8 is referred to as an aqueous phase A, and an aqueous phase having a pH of 0.5 to 3 is referred to as an aqueous phase B.

The aqueous phases A and B both dissolve a water-soluble antioxidant. The pH can be adjusted by adding acid or alkali, or by using an ascorbic acid salt etc. as part or all of the water-soluble antioxidant.

In addition to the water-soluble antioxidant, it is desirable to dissolve a water-soluble solid in the aqueous phases. This is because the incorporation of a water-soluble solid, in addition to the water-soluble antioxidant, can facilitate fine dispersion of the aqueous phases in the oil phase. This is also because the incorporation thereof leads to the effect of suppressing the appearance of unpleasant odor.

In the present invention, an oil phase is prepared. The oil phase must contain an unsaturated fatty acid. The oil phase desirably contains an oil-soluble emulsifier. When the oil phase contains an oil-soluble emulsifier, the water-in-oil emulsified state, in which the aqueous phases are dispersed, will be more stable, and a strong effect in suppressing unpleasant odor will be achieved.

Next, the aqueous phases are dispersed in the oil phase. In doing so, ingenuity is required so as to form a water-in-oil structure in which the aqueous phases A and B are dispersed as independent water droplets separately from each other in the oil phase. Specific examples include a method comprising finely dispersing a first aqueous phase in the oil phase, and then adding a second aqueous phase thereto for fine dispersion; and a method comprising appropriately dividing the oil phase into oil phases, finely dispersing the aqueous phases in the respective oil phases to obtain water-in-oil emulsions, and then mixing the resulting water-in-oil emulsions.

The former method is preferred in terms of work efficiency, but the latter is desirable in terms of the oxidation stability effect. This is believed to be because in the former method, in the step of fine dispersion after the second aqueous phase is added, a certain amount of the aqueous phase merges with a portion of the first aqueous phase particles.

To finely disperse the aqueous phases in the oil phase, an emulsifying device for emulsification can be used. Specific examples of usable emulsifying device include a high-pressure homogenizer, an ultrasonic emulsifying device, and a two-component impingement-type emulsifying device, which is also called a wet-jet mill. The use of an appropriate emulsifying device makes it possible to obtain a predetermined unsaturated-fatty-acid-containing water-in-oil composition. Emulsification with the use of a high-pressure homogenizer is commonly performed at 30 to 40 MPa and 10 to 30 passes.

According to the above method, the unsaturated-fatty-acid-containing water-in-oil composition of the present invention can be obtained. In this product, the appearance of an unpleasant odor in the initial stage of storage and the appearance of subsequent unpleasant odor can be suppressed more than in conventional unsaturated-fatty-acid-containing compositions.

Examples are described below.

EXAMPLES

Study 1: Preparation of Various Antioxidant Compositions

Various types of antioxidant compositions were prepared in accordance with the formulations shown in Table 1-1. The preparation was performed according to the "Preparation Method for Antioxidant Composition."

TABLE 1-1

| | | Formulation | | | | | |
|---|---|---|---|---|---|---|---|
| | | Study 1-1 | Study 1-2 | Study 1-3 | Study 1-4 | Study 1-5 | Study 1-6 |
| Oil phase | Emulsifier | 12.0 | 7.0 | 8.25 | 10.0 | 10.0 | 10.0 |
| | Soybean oil | 69.0 | 74.0 | 72.75 | 62.0 | 72.0 | 67.0 |
| Aqueous phase | Ascorbic acid | 2.2 | — | 0.55 | — | — | — |
| | Sodium ascorbate | — | 7.0 | 5.25 | — | 8.0 | 4.0 |
| | Tea catechin | 1.3 | 1.3 | 1.3 | — | — | — |
| | Catechin | — | — | — | 10.0 | — | 5.0 |
| | Citric acid | — | — | — | 8.0 | — | 4.0 |
| | Sugar | 7.5 | 2.7 | 3.9 | — | — | — |
| | Water | 8.0 | 8.0 | 8.0 | 10.0 | 10.0 | 10.0 |
| Total | | 100.0 | 100.0 | 100.0 | 100.0 | 100.0 | 100.0 |
| pH of the aqueous phase | | 2.0 | 6.8 | 5.37 | 0.9 | 7.3 | 3.2 |
| Concentration of the water-soluble antioxidant in the aqueous phase (mass %) | | 18.4 | 43.7 | 37.4 | 35.7 | 44.4 | 39.1 |
| Concentration of the water-soluble solid in the aqueous phase (mass %) | | 57.9 | 57.9 | 57.9 | 64.3 | 44.4 | 56.5 |
| Percentage of the aqueous phase (mass %) | | 19.0 | 19.0 | 19.0 | 28.0 | 18.0 | 23.0 |

(The formulations are in mass %.)

For the emulsifier, a polyglycerol condensed ricinoleic acid ester "CRS-75" produced by Sakamoto Yakuhin Kogyo Co., Ltd. was used.

For the tea extract, "Sunphenon 90S" produced by Taiyo Kagaku Co., Ltd. was used. This product contained tea catechin as a major component.

For the catechin, "Pharma Foods Delicious Catechin PF-TP80" produced by Pharma Foods International Co., Ltd. was used.

The particle sizes of the aqueous phases were all 500 nm or less.

Preparation Method for Antioxidant Composition

1. The starting materials of the aqueous phase shown in the formulation table were dissolved by mixing to obtain an aqueous phase. Additionally, the starting materials of the oil phase were dissolved by mixing to obtain an oil phase. The pH column of the formulation table shows the actual pH value of the aqueous phases.

2. The aqueous phase was introduced into the oil phase, and the mixture was mixed with a homomixer to obtain an emulsified liquid.

3. Further, a high-pressure homogenizer (37 MPa, 20 passes) was used to obtain a water-in-oil emulsion.

Study 2: Confirmation of Impact on Appearance of Unpleasant Odor

Unsaturated-fatty-acid-containing water-in-oil compositions were prepared by adding the antioxidant composition to the polyunsaturated-fatty-acid-containing fat and oil in accordance with Table 2-1. The preparation was performed in accordance with the "Preparation Method for Unsaturated-fatty-acid-containing Water-in-oil Composition."

Each of the obtained samples was subjected to an accelerated test to confirm the impact on the appearance of unpleasant odor. The test was performed in accordance with the "Oxidation Stability Evaluation Method." Table 2-2 shows the results.

Samples evaluated as "A" were defined as pass.
Samples evaluated as "B" were defined as fail.

TABLE 2-1

| Formulation | Ex. 2-1 | Ex. 2-2 | Ex. 2-3 | Comp. Ex. 2-1 | Comp. Ex. 2-2 | Comp. Ex. 2-3 |
|---|---|---|---|---|---|---|
| Polyunsaturated-fatty-acid-containing fat and oil | 70 | 70 | 85 | 70 | 70 | 85 |
| Study 1-1 | 7.5 | — | 3.75 | — | — | — |
| Study 1-2 | 22.5 | — | 11.25 | — | — | — |
| Study 1-3 | — | — | — | 30 | — | 15 |
| Study 1-4 | — | 15 | — | — | — | — |
| Study 1-5 | — | 15 | — | — | — | — |
| Study 1-6 | — | — | — | — | 30 | — |
| Total | 100 | 100 | 100 | 100 | 100 | 100 |
| Percentage of the aqueous phase (mass %) | 5.7 | 6.9 | 2.85 | 5.7 | 6.9 | 2.85 |
| Amount ratio of the aqueous phases (A:B) | 75:25 | 39:61 | 75:25 | — | — | — |
| Total amount of DHA and EPA (mass %) | 33.6 | 33.6 | 40.8 | 33.6 | 33.6 | 40.8 |

(The formulations are in mass %.)

For the polyunsaturated-fatty-acid-containing fat and oil, fat and oil containing 328 mg/g of DHA and 152 mg/g of EPA was used.

The amounts of the antioxidant were adjusted to be consistent between Example 2-1 and Comparative Example 2-1, between Example 2-2 and Comparative Example 2-2, and between Example 2-3 and Comparative Example 2-3, for comparison.

Preparation Method for Unsaturated-Fatty-Acid-Containing Water-in-Oil Composition In accordance with the formulations, the polyunsaturated-fatty-acid-containing fat and oil and the antioxidant compositions were mixed and lightly blended to obtain antioxidant polyunsaturated-fatty-acid-containing fat-and-oil compositions.

Oxidation Stability Evaluation Method

1. Each of the prepared samples (20 g) was placed in a 100-ml vial bottle and allowed to stand in an incubator at 60° C. for storage.

2. As appropriate, a sensory evaluation was performed in terms of the headspace of each bottle for the unpleasant odor in the initial stage of storage, and separately for the unpleasant odor of the unsaturated fatty acid that would typically appear in the later stage of storage. The sensory evaluation method was performed in accordance with the following method.

Sensory Evaluation Method for Unpleasant Odor in the Initial Stage of Storage

1. On the second day of storage, 0.5 ml of sample was taken from the headspace of each bottle using a syringe.

2. Four skilled panelists smelled each odor and rated the samples in a group meeting in accordance with the following criteria.

+ was defined as fail.
± and − were defined as pass.
+: A sample having an unpleasant odor that is not as strong as the odor that appears with an increase in the POV, and having a weak unpleasant odor that is perceived as a slight discomfort.
±: A sample having almost no odor.
−: A sample having no odor.

Sensory Evaluation Method for Unpleasant Odor in the Later Stage of Storage 1. 0.5 ml of sample was taken from the headspace of each bottle using a syringe.

2. Four skilled panelists smelled each odor and rated the samples in a group meeting in accordance with the following criteria.

3. The rating in 2 was continued over time until one of the samples for comparison was rated 2 or less. Rating 2 or less was defined as fail.

Rating 5: A sample having no unpleasant odor or fish smell.
Rating 4: A sample having some odor that could not be identified as either a unpleasant odor or fish smell.
Rating 3: A sample having a slight but tolerable unpleasant odor or fish smell.
Rating 2: A sample having unpleasant odor or fish smell.
Rating 1: A sample having slightly strong unpleasant odor or fish smell (equivalent to commercial fish oils).
Rating 0: A sample having very strong unpleasant odor or fish smell.

TABLE 2-2

| Results | Ex. 2-1 | Ex. 2-2 | Ex. 2-3 | Comp. Ex. 2-1 | Comp. Ex. 2-2 | Comp. Ex. 2-3 |
|---|---|---|---|---|---|---|
| Day 2 (initial stage of storage) | ± | ± | ± | ± | ± | ± |
| Determination in terms of the initial stage of storage | A | A | A | A | A | A |
| Day 10 (later stage of storage) | 5 | 5 | — | 5 | 5 | — |
| Day 14 (later stage of storage) | 5 | 5 | 3 | 5 | 5 | 3 |
| Day 19 (later stage of storage) | 4 | 5 | — | 4 | 5 | — |
| Day 21 (later stage of storage) | — | — | 3 | — | — | 2 |
| Day 25 (later stage of storage) | 3 | — | — | 3 | — | — |
| Day 34 (later stage of storage) | 3 | 3 | — | 2 | 2 | — |
| Determination in terms of the later stage of storage | A | A | A | B | B | B |
| Overall evaluation of the initial and later stages | A | A | A | B | B | B |

None of the samples showed an increase in the POV on day 2.

Discussion

Although the absolute amounts of the water-soluble antioxidant(s) added were the same, the appearance of unpleasant odor was confirmed to be suppressed more when water-soluble antioxidants were added as multiple aqueous phases having different pH values, as in the present invention.

Study 3

Various types of antioxidant compositions were prepared in accordance with the formulations shown in Table 3-1. The preparation was performed in accordance with the "Preparation Method for Antioxidant Composition 2."

TABLE 3-1

| | | Formulation | | | | |
|---|---|---|---|---|---|---|
| | | Study 3-1 | Study 3-2 | Study 3-3 | Study 3-4 | |
| Oil phase | Emulsifier | 10.0 | 10.0 | 10.0 | 10.0 | |
| | Soybean oil | 62.0 | 72.0 | 67.0 | 67.0 | |
| Aqueous phase | Sodium ascorbate | — | 8.0 | 4.0 | — | 4.0 |
| | Catechin | 10.0 | — | 5.0 | 5.0 | — |
| | Citric acid | 8.0 | — | 4.0 | 4.0 | — |
| | Water | 10.0 | 10.0 | 10.0 | 5.0 | 5.0 |
| Total | | 100.0 | 100.0 | 100.0 | 100.0 | |
| pH of the aqueous phase | | 0.9 | 7.3 | 3.2 | 0.9 | 7.3 |
| Concentration of the water-soluble antioxidant in the aqueous phase (mass %) | | 35.7 | 39.6 | 37.2 | 35.7 | 39.6 |
| Concentration of the water-soluble solid in the aqueous phase (mass %) | | 64.3 | 44.4 | 56.5 | 64.3 | 44.4 |
| Percentage of the aqueous phase (mass %) | | 28.0 | 18.0 | 23.0 | 23.0 | |

(The formulations are in mass %.)

- For the emulsifier, a polyglycerol condensed ricinoleic acid ester "CRS-75" produced by Sakamoto Yakuhin Kogyo Co., Ltd. was used.
- For the catechin, "Pharma Foods Delicious Catechin PF-TP80" produced by Pharma Foods International Co., Ltd. was used.
- The particle sizes of the aqueous phases were all 500 nm or less.

Preparation Method for Antioxidant Composition 2

In studies 3-1, 3-2, and 3-3, the preparation was performed in accordance with the "Preparation Method for Antioxidant Composition."

In study 3-4, the preparation was performed in accordance with the following method.

1. The starting materials of the oil phase shown in the formulation table were dissolved by mixing to obtain an oil phase.

2. Aqueous phases were prepared using the components shown in the left column (catechin, citric acid, and water) or the right column (sodium ascorbate and water). The aqueous phase prepared with the components shown in the left column was referred to as an aqueous phase 1, and the aqueous phase prepared with the components shown in the right column was referred to as an aqueous phase 2.

3. The aqueous phase 1 was introduced into the oil phase, and the mixture was mixed with a homomixer to obtain an emulsified liquid. Further, a high-pressure homogenizer (37 MPa, 20 passes) was used to obtain a water-in-oil emulsion.

4. The aqueous phase 2 was introduced into the water-in-oil emulsion prepared in 3, and the mixture was mixed with a homomixer to obtain an emulsified liquid. Further, a high-pressure homogenizer (37 MPa, 20 passes) was used to obtain a water-in-oil emulsion.

Study 4: Confirmation of Impact on Appearance of Unpleasant Odor

Unsaturated-fatty-acid-containing water-in-oil compositions were prepared by adding the antioxidant compositions to the polyunsaturated-fatty-acid-containing fat and oil in accordance with Table 4-1. The preparation was performed in accordance with the "Preparation Method for Unsaturated-fatty-acid-containing Water-in-oil Composition."

Each of the obtained samples was subjected to an accelerated test to confirm the impact on the appearance of unpleasant odor. The test was performed in accordance with the "Oxidation Stability Evaluation Method 2." Table 4-2 shows the results.

TABLE 4-1

| | Formulation | | | | |
|---|---|---|---|---|---|
| | Comp. Ex. 4-1 | Comp. Ex. 4-2 | Comp. Ex. 4-3 | Ex. 4-1 | Ex. 4-2 |
| Polyunsaturated-fatty-acid-containing fat and oil | 70.0 | 70.0 | 70.0 | 70.0 | 70.0 |
| Study 3-1 | 30.0 | — | — | 15.0 | — |
| Study 3-2 | — | 30.0 | — | 15.0 | — |
| Study 3-3 | — | — | 30.0 | — | — |
| Study 3-4 | — | — | — | — | 30.0 |
| Total | 100.0 | 100.0 | 100.0 | 100.0 | 100.0 |
| Percentage of the aqueous phase (mass %) | 8.4 | 5.4 | 6.9 | 6.9 | 6.9 |
| Amount ratio of the aqueous phases (A:B) | — | — | — | 39:61 | 39:61 |
| Total amount of DHA and EPA | 33.6 | 33.6 | 33.6 | 33.6 | 33.6 |

(The formulations are in mass %.)

- For the polyunsaturated-fatty-acid-containing fat and oil, fat and oil containing 328 mg/g of DHA and 152 mg/g of EPA was used.

TABLE 4-2

| | Results | | | | |
|---|---|---|---|---|---|
| | Comp. Ex. 4-1 | Comp. Ex. 4-2 | Comp. Ex. 4-3 | Ex. 4-1 | Ex. 4-2 |
| Day 2 (initial stage of storage) | ± | ± | ± | ± | ± |
| Determination in terms of the initial stage of storage | B | A | A | A | A |
| Day 10 | 4 | 3 | 4 | 4 | 4 |
| Day 16 | 4 | 2 | 1 | 4 | 4 |
| Day 23 | — | 2 | 2 | 4 | 3 |
| Day 34 | — | 2 | 1 | 3 | 3 |
| Determination in terms of the later stage of storage | — | B | B | A | A |
| Overall evaluation of the initial and later stages | B | B | B | A | A |

None of the samples showed an increase in the POV on day 2.

Oxidation Stability Evaluation Method 2

1. Each of the prepared samples (20 g) was placed in a 100-ml vial bottle and allowed to stand in an incubator at 60° C. for storage.

2 As appropriate, a sensory evaluation was performed in terms of the headspace of each bottle for the unpleasant odor in the initial stage of storage, and separately for the unpleasant odor of the unsaturated fatty acid that would typically appear in the later stage of storage. The sensory evaluation method was performed in accordance with the following method.

Sensory Evaluation Method for Unpleasant Odor in the Initial Stage of Storage

1. On the second day of storage, 0.5 ml of sample was taken from the headspace of each bottle using a syringe.

2. Four skilled panelists smelled each odor and rated the samples in a group meeting in accordance with the following criteria.

+ was defined as fail.

± and − were defined as pass.

+: A sample having an unpleasant odor that is not as strong as the odor that appears with an increase in the POV, and having a weak unpleasant odor that is perceived as a slight discomfort.

±: A sample having almost no odor.

−: A sample having no odor.

Sensory Evaluation Method for Unpleasant Odor in the Later Stage of Storage 1. 0.5 ml of sample was taken from the headspace of each bottle using a syringe.

2. Four skilled panelists smelled each odor and rated the samples in a group meeting in accordance with the following criteria.

3. The rating in 2 was continued over time. Rating 2 or less was defined as fail.

Rating 5: A sample having no unpleasant odor or fish smell.

Rating 4: A sample having some odor that could not be identified as either a unpleasant odor or fish smell.

Rating 3: A sample having a slight but tolerable unpleasant odor deterioration smell or fish smell.

Rating 2: A sample having unpleasant odor or fish smell.

Rating 1: A sample having slightly strong unpleasant odor or fish smell (equivalent to commercial fish oils).

Rating 0: A sample having very strong unpleasant odor or fish smell.

Discussion

Comparative Example 4-1 and Comparative Example 4-2 are directed to polyunsaturated-fatty-acid-containing fat-and-oil compositions comprising an antioxidant composition as a single aqueous phase. Comparative Example 4-1 was determined as fail in the initial evaluation since discomfort was perceived; the overall evaluation was also determined as fail. Comparative Example 4-2 was determined as pass in the initial evaluation, but was determined as fail in the later evaluation; the overall evaluation was determined as fail.

The formulation of Comparative Example 4-3 was a mixture of the aqueous phases of Comparative Examples 4-1 and 4-2. Comparative Example 4-3 was determined as pass in the initial evaluation, but was determined as fail in the later evaluation.

The composition of Example 4-1 was obtained by dispersing the aqueous phases individually in respective oil phases, followed by mixing; the results revealed that the appearance of unpleasant odor was suppressed in the initial and later stages.

Example 4-2 is directed to an antioxidant polyunsaturated-fatty-acid-containing fat-and-oil composition prepared by using an antioxidant composition that was prepared by dispersing two aqueous phases with different pH values in an oil phase in a stepwise manner; the results also revealed that the appearance of unpleasant odor was suppressed in the initial and later stages.

The invention claimed is:

1. An unsaturated-fatty-acid-containing water-in-oil composition comprising:
    an aqueous phase A having a pH adjusted to 3.1 to 8 in which at least one water-soluble antioxidant selected from the group consisting of ascorbic acid and polyphenols is dissolved,
    an aqueous phase B having a pH adjusted to 0.5 to 3 in which at least one water-soluble antioxidant selected from the group consisting of ascorbic acid and polyphenols is dissolved, and
    an oil phase containing an unsaturated fatty acid,
    the aqueous phase A and the aqueous phase B, each having a particle size of 500 nm or less, being finely dispersed individually in the oil phase.

2. The unsaturated-fatty-acid-containing water-in-oil composition according to claim 1, wherein the water-soluble antioxidant dissolved in the aqueous phase A is at least one member selected from the group consisting of ascorbic acid and tea catechin.

3. The unsaturated-fatty-acid-containing water-in-oil composition according to claim 1, wherein the water-soluble antioxidant dissolved in the aqueous phase B is at least one member selected from the group consisting of ascorbic acid and tea catechin.

4. The unsaturated-fatty-acid-containing water-in-oil composition according to claim 1, wherein the unsaturated fatty acid is a polyunsaturated fatty acid.

5. A method for producing an unsaturated-fatty-acid-containing water-in-oil composition, comprising
    1) Preparing an aqueous phase A having a pH adjusted to 3.1 to 8 in which at least one member selected from the group consisting of ascorbic acid and polyphenols is dissolved,
    2) Preparing an aqueous phase B having a pH adjusted to 0.5 to 3 in which at least one member selected from the group consisting of ascorbic acid and polyphenols is dissolved,
    3) Preparing an oil phase containing an unsaturated fatty acid, and
    4) Dispersing the aqueous phases A and B individually in the oil phase.

6. A method for producing an unsaturated-fatty-acid-containing water-in-oil composition, comprising
    1) Preparing an aqueous phase A having a pH adjusted to 3.1 to 8 in which at least one member selected from the group consisting of ascorbic acid and polyphenols is dissolved,
    2) Preparing an aqueous phase B having a pH adjusted to 0.5 to 3 in which at least one member selected from the group consisting of ascorbic acid and polyphenols is dissolved,
    3) Preparing an oil phase containing an unsaturated fatty acid,
    4) Dividing the oil phase of 3) into oil phases to disperse the aqueous phase A and the aqueous phase B in the oil phases respectively to form water-in-oil emulsions, and
    5) Mixing the water-in-oil emulsions obtained in 4).

7. A method for suppressing both an unpleasant odor that appears in an initial stage of storage and an unpleasant odor that appears subsequently in an unsaturated-fatty-acid-containing water-in-oil composition, comprising 1) Preparing an aqueous phase A having a pH adjusted to 3.1 to 8 in which at least one member selected from the group consisting of ascorbic acid and polyphenols is dissolved,
2) Preparing an aqueous phase B having a pH adjusted to 0.5 to 3 in which at least one member selected from the group consisting of ascorbic acid and polyphenols is dissolved,
3) Preparing an oil phase containing an unsaturated fatty acid, and
4) Dispersing the aqueous phases A and B individually in the oil phase.

8. A method for suppressing both an unpleasant odor that appears in an initial stage of storage and an unpleasant odor that appears subsequently in an unsaturated-fatty-acid-containing water-in-oil composition, comprising
1) Preparing an aqueous phase A having a pH adjusted to 3.1 to 8 in which at least one member selected from the group consisting of ascorbic acid and polyphenols is dissolved,
2) Preparing an aqueous phase B having a pH adjusted to 0.5 to 3 in which at least one member selected from the group consisting of ascorbic acid and polyphenols is dissolved,
3) Preparing an oil phase containing an unsaturated fatty acid,
4) Dividing the oil phase of 3) into oil phases to disperse the aqueous phase A and the aqueous phase B in the oil phases respectively to form water-in-oil emulsions, and
5) mixing the water-in-oil emulsions obtained in 4).

* * * * *